US012644761B2

(12) United States Patent (10) Patent No.: US 12,644,761 B2
Song et al. (45) Date of Patent: Jun. 2, 2026

(54) SLOPE DETECTION APPARATUS AND METHOD BASED ON DISTRIBUTED OPTICAL FIBER SENSING

(71) Applicant: Tsinghua University, Beijing (CN)

(72) Inventors: Danqing Song, Beijing (CN); Xiaoli Liu, Beijing (CN); Wenfa Yan, Beijing (CN); Guanfu Chen, Beijing (CN); Yufang Zhang, Beijing (CN); Jian Li, Beijing (CN)

(73) Assignee: Tsinghua University, Beijing (CN)

( * ) Notice: Subject to any disclaimer, the term of this patent is extended or adjusted under 35 U.S.C. 154(b) by 411 days.

(21) Appl. No.: 18/105,538

(22) Filed: Feb. 3, 2023

(65) Prior Publication Data

US 2024/0011825 A1 Jan. 11, 2024

(30) Foreign Application Priority Data

Jul. 5, 2022 (CN) ......................... 202210794631.X

(51) Int. Cl.
G01H 9/00 (2006.01)
G01B 11/16 (2006.01)
G01L 1/24 (2006.01)
(52) U.S. Cl.
CPC ............. G01H 9/006 (2013.01); G01B 11/16 (2013.01); G01L 1/242 (2013.01)
(58) Field of Classification Search
CPC ........ G01H 9/006; G01H 9/002; G01B 11/16; G01L 1/103; G01L 1/242; G01L 1/10; G01L 1/24
See application file for complete search history.

(56) References Cited

U.S. PATENT DOCUMENTS

2004/0240769 A1* 12/2004 Spirin .................... G01L 1/242
385/12

FOREIGN PATENT DOCUMENTS

| CA | 3036133 A1 * | 3/2018 | ............. G01H 9/004 |
| CA | 3078842 A1 * | 4/2019 | ............. E21B 47/10 |
| CN | 106525215 A * | 3/2017 | |

(Continued)

OTHER PUBLICATIONS

CN_106525215_A (English Translation) (Year: 2017).*

(Continued)

*Primary Examiner* — Thomas A Hollweg
*Assistant Examiner* — Mary A El-Shammaa
(74) *Attorney, Agent, or Firm* — Fishman Stewart PLLC

(57) ABSTRACT

This application discloses a slope detection apparatus and method based on distributed optical fiber sensing. The apparatus includes: optical fiber measuring units arranged inside a slope and configured to measure acceleration time sequences of a plurality of state parameters of the slope; a demodulator, where the demodulator is connected to the optical fiber measuring units and configured to receive the acceleration time sequences of the slope; and a terminal device, where the terminal device is connected to the demodulator and configured to perform multi-domain coupling analysis on the acceleration time sequences so as to generate a feature cloud map of the slope, perform sub-item detection on slope stability state based on the feature cloud map and preset multi-domain feature parameter indexes so as to obtain a sub-item detection result of the state of the slope.

8 Claims, 4 Drawing Sheets

(56) References Cited

FOREIGN PATENT DOCUMENTS

| | | | | | | |
|----|-----------------|----|---|---------|--------------|-------------|
| CN | 108507663 | A | * | 9/2018 | ............. | G01H 9/004 |
| CN | 110220470 | A | * | 9/2019 | ............. | G01B 11/18 |
| CN | 111307054 | A | * | 6/2020 | | |
| CN | 112254660 | A | * | 1/2021 | ............. | G01B 11/16 |
| CN | 112556903 | A | * | 3/2021 | | |
| CN | 113074649 | A | * | 7/2021 | ............. | E02D 33/00 |
| CN | 114674456 | A | * | 6/2022 | | |
| WO | WO-2013180496 | A2 | * | 12/2013 | ............. | B63B 21/00 |
| WO | WO-2020193804 | A1 | * | 10/2020 | ......... | G01D 5/35364 |
| WO | WO-2022078600 | A1 | * | 4/2022 | ........... | E21B 47/107 |

OTHER PUBLICATIONS

CN_108507663_A (English Translation) (Year: 2018).*
CN_110220470_A (English Translation) (Year: 2019).*
CN_111307054_A (English Translation) (Year: 2020).*
CN_112254660_A (English Translation) (Year: 2021).*
CN_112556903_A (English Translation) (Year: 2021).*
CN_113074649_A (English Translation) (Year: 2021).*
CN_114674456_A (English Translation) (Year: 2022).*
WO_2013180496_A2 (English Translation) (Year: 2013).*

* cited by examiner

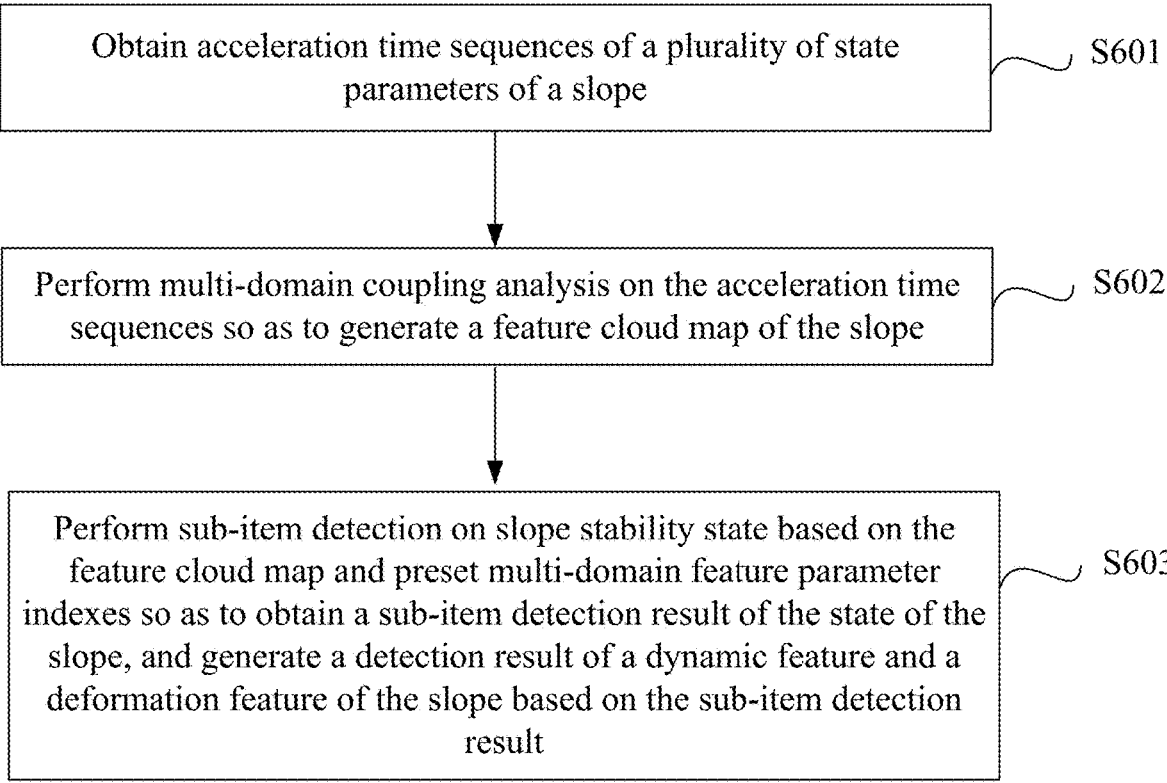

Obtain acceleration time sequences of a plurality of state parameters of a slope — S601

Perform multi-domain coupling analysis on the acceleration time sequences so as to generate a feature cloud map of the slope — S602

Perform sub-item detection on slope stability state based on the feature cloud map and preset multi-domain feature parameter indexes so as to obtain a sub-item detection result of the state of the slope, and generate a detection result of a dynamic feature and a deformation feature of the slope based on the sub-item detection result — S603

FIG. 6

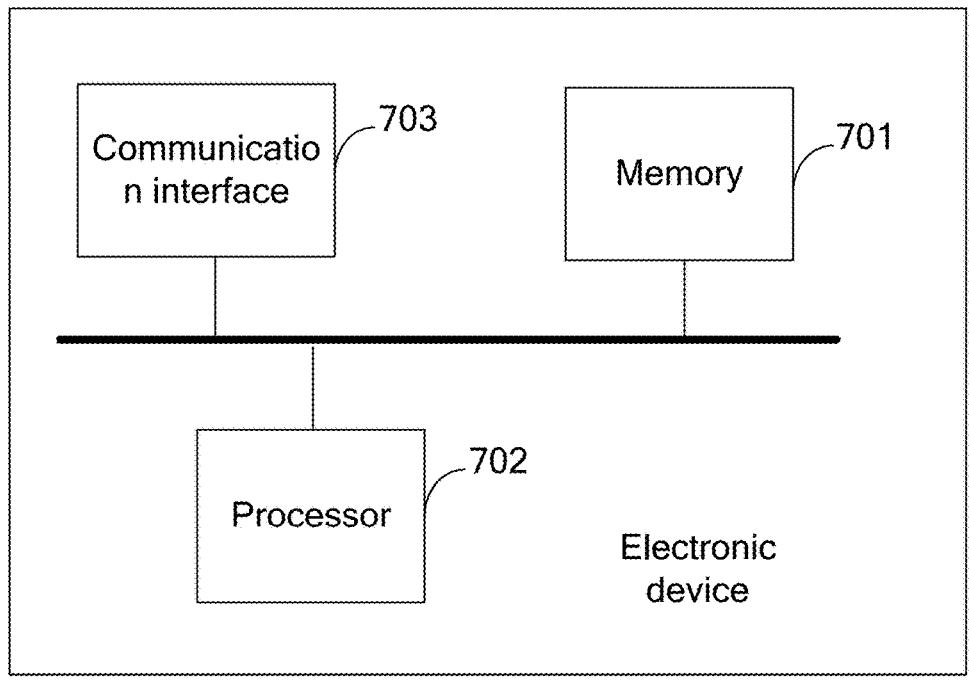

Communication interface — 703

Memory — 701

Processor — 702

Electronic device

FIG. 7

SLOPE DETECTION APPARATUS AND METHOD BASED ON DISTRIBUTED OPTICAL FIBER SENSING

CROSS REFERENCE TO RELATED APPLICATION

This patent application claims the benefit of and priority to Chinese Patent Application No. 202210794631.X, filed with the China National Intellectual Property Administration on Jul. 5, 2022, the disclosure of which is incorporated by reference herein in its entirety as part of the present application.

TECHNICAL FIELD

This application relates to the technical field of geotechnical engineering vibration measurement, and in particular to a slope detection apparatus and method based on distributed optical fiber sensing.

BACKGROUND

Slope deformation, as one of the major global natural disasters, is mainly caused due to external factors, which further leads to slope instability and slide. In addition, landslide has become a geological disaster, seriously threatening people's lives and properties. Specifically, under long-term internal and external dynamic effects such as earthquake, heavy rainfall, excavating and unloading, natural weathering, freeze thawing, and crack development, many slopes in nature have been damaged and deformed to some extent, and thus become unstable. As a result, landslide disasters are likely to occur under these triggers. Landslide disaster prevention or control has become one of the important engineering constructions to reduce the damage of geological disasters. Deformation features such as slope stability state and loss position can be quickly determined through slope health monitoring and diagnosis, which have become important prerequisites for landslide prevention and control. In particular, structural surfaces, joints, and weak interlayers in the slope have obvious discontinuous features, which make it difficult to determine the slope stability. Therefore, it is necessary to conduct health monitoring and diagnosis for the deformation features and stability state of slopes in human activity regions.

The distributed fiber acoustic sensing (DAS) technology is a new type of optical fiber sensing technology that uses the optical fiber as a sensor and acquires vibration signals based on Rayleigh scattering of light. With low costs, and high measurement precision, such technology further has the advantages of being free from electromagnetic interference and easy to mount. As compared with conventional single-point and quasi-distributed sensors, DAS is more suitable for long-distance or high temporal- and spatial-resolution application scenarios, and is widely used in oil exploration, pipeline leakage monitoring, and border security monitoring. However, at present, the application of DAS technology in the field of geotechnical engineering is still in the development stage. Due to internal and external dynamic effects such as geological structure, seismic load, and periodic heavy rainfall, the interior parts of the slope are damaged to various degrees, resulting in an extremely complex catastrophic process of the slope. Therefore, it is particularly necessary to carry out health monitoring and diagnosis for complex slope stability. At present, most sensors such as acceleration and displacement sensors are configured to detect the slope body, or the elastic wave method is used to detect the microseism of the slope, and the deformation trend and stability state of the slope are determined by analyzing the change features of acceleration, displacement, and other data. The determining results of the stability state of slopes based only on time-domain parameters such as acceleration and displacement usually have many uncertainties. The vibration features of the slope include three factors: time, frequency, and amplitude, and it is necessary to further combine the time domain, frequency domain and frequency domain so as to determine the stability state of the slope. The slope has feature rules in the time domain, frequency domain and time-frequency domain under multi-load coupling and complex geological conditions. Accurate monitoring and determining of damage states in different regions of a slope are prerequisites for accurate reinforcement of the slope through time-sharing and partitioning. However, at present, there are few studies on the systematic analysis of slope stability state using parameters of multiple domains including the time domain, frequency domain, and time-frequency domain. In particular, the multi-domain and multi-parameter slope stability health monitoring and diagnosis methods based on DAS technology are rarely studied, and therefore this field is still blank.

The axial sensitivity of optical fibers leads to different response mechanisms of optical fibers to different types of seismic waves. Based on the propagation features of seismic waves, studying the effects of seismic wave incident angle, velocity features, and medium physical properties on the axial strain of optical fibers will help to better understand the role of DAS in seismic data acquisition. Since the longitudinal wave and the transverse wave are coupled together, during the conventional geotechnical engineering monitoring, the vibration signals in the three directions of X, Y, and Z are orthogonal to each other, and the three component signals need to be processed so as to indirectly obtain the longitudinal and transverse wave information. At present, the distributed optical fiber measurement technology using three-component ground motion and three-component strain has not been applied to the field of slope engineering, and therefore this field is still blank.

In summary, in view of the existing complex slope damage state and stability health monitoring and diagnosis problems, the related art lacks efficient and precise scientific monitoring and analysis methods and technologies for targeted slope reinforcement treatment through time sharing and partitioning, which needs to be resolved urgently.

SUMMARY

This application provides a slope detection apparatus and method based on distributed optical fiber sensing, to resolve the problem that the related art lacks efficient and precise scientific monitoring and analysis methods for targeted slope reinforcement treatment through time sharing and partitioning.

An embodiment according to a first aspect of this application discloses a slope detection apparatus based on distributed optical fiber sensing, including: optical fiber measuring units arranged inside a slope and configured to measure acceleration time sequences of a plurality of state parameters of the slope; a demodulator, where the demodulator is connected to the optical fiber measuring units and configured to receive the acceleration time sequences of the slope; and a terminal device, where the terminal device is connected to the demodulator and configured to perform multi-domain coupling analysis on the acceleration time sequences so as to generate a feature cloud map of the slope, perform sub-item detection on slope stability state based on the feature cloud map and preset multi-domain feature parameter indexes so as to obtain a sub-item detection result of the state of the slope, and generate a detection result of a dynamic feature and a deformation feature of the slope based on the sub-item detection result.

Optionally, in an embodiment of this application, the state parameters of the slope include one or more of slope vibration, temperature, pressure, strain, or moisture content.

Optionally, in an embodiment of this application, an arrangement manner of the optical fiber measuring units includes: arranging the optical fiber measuring units in a surrounding manner in an S-shape at preset intervals along a surface of the slope, drilling bores at fixed points in the slope, and connecting the optical fiber measuring units in series inside bores drilled at fixed points in the slope.

Optionally, in an embodiment of this application, the step of performing the multi-domain coupling analysis on the acceleration time sequences so as to generate the feature cloud map includes: performing time domain transform analysis on the acceleration time sequences so as to obtain peak accelerations in different positions of the slope, and generating a first distribution cloud map of peak accelerations of different transverse and longitudinal sections of the slope based on the peak accelerations; performing frequency domain transform analysis on the acceleration time sequences, and generating a second distribution cloud map of spectral peaks of the different transverse and longitudinal sections of the slope by analyzing a spectrum and a peak change feature; performing time-frequency domain transform analysis on the acceleration time sequences, and generating a third distribution cloud map of energy spectrum peaks of the different transverse and longitudinal sections of the slope by analyzing an energy spectrum feature and a peak change; and generating the feature cloud map of the slope based on the first distribution cloud map, the second distribution cloud map, and the third distribution cloud map.

Optionally, in an embodiment of this application, the multi-domain feature parameter indexes include a time domain parameter index, a frequency domain parameter index, and a time-frequency domain parameter index, where the time domain parameter index includes one or more of peak acceleration, Peak Ground Acceleration (PGA), amplification factor, peak displacement, Residual Displacement (RD), or Plastic Effect Coefficient (PEC); the frequency domain parameter index includes one or more of natural frequency, relative displacement, or spectral peak; and the time-frequency domain parameter index includes one or more of arias intensity, seismic Hilbert energy spectrum peak, or marginal spectrum peak.

An embodiment according to a second aspect of this application provides a slope detection method based on distributed optical fiber sensing, including the following steps: obtaining acceleration time sequences of a plurality of state parameters of a slope; performing multi-domain coupling analysis on the acceleration time sequences so as to generate a feature cloud map; and performing sub-item detection on slope stability state based on the feature cloud map and preset multi-domain feature parameter indexes so as to obtain a sub-item detection result of the state of the slope, and generating a detection result of a dynamic feature and a deformation feature of the slope based on the sub-item detection result.

Optionally, in an embodiment of this application, the step of performing the multi-domain coupling analysis on the acceleration time sequences so as to generate the feature cloud map includes: performing time domain transform analysis on the acceleration time sequences so as to obtain peak accelerations in different positions of the slope, and generating a first distribution cloud map of peak accelerations of different transverse and longitudinal sections of the slope based on the peak accelerations; performing frequency domain transform analysis on the acceleration time sequences, and generating a second distribution cloud map of spectral peaks of the different transverse and longitudinal sections of the slope by analyzing a spectrum and a peak change feature; performing time-frequency domain transform analysis on the acceleration time sequences, and generating a third distribution cloud map of energy spectrum peaks of the different transverse and longitudinal sections of the slope by analyzing an energy spectrum feature and a peak change; and generating the feature cloud map of the slope based on the first distribution cloud map, the second distribution cloud map, and the third distribution cloud map.

Optionally, in an embodiment of this application, the multi-domain feature parameter indexes include a time domain parameter index, a frequency domain parameter index, and a time-frequency domain parameter index, where the time domain parameter index includes one or more of peak acceleration, PGA, amplification factor, peak displacement, RD, or PEC; the frequency domain parameter index includes one or more of natural frequency, relative displacement, or spectral peak; and the time-frequency domain parameter index includes one or more of arias intensity, seismic Hilbert energy spectrum peak, or marginal spectrum peak.

An embodiment according to a third aspect of this application provides an electronic device, including a memory, a processor, and a computer program stored on the memory and capable of running on the processor, where the processor executes the program to implement the slope detection method based on distributed optical fiber sensing according to the foregoing embodiment.

An embodiment according to a fourth aspect of this application provides a computer-readable storage medium, storing a computer program, where the program is executed by a processor to implement the slope detection method based on distributed optical fiber sensing according to the foregoing embodiment.

Thus, the embodiments of this application have the following beneficial effects:

In the embodiments of this application, optical fiber measuring units are arranged inside a slope and configured to measure acceleration time sequences of a plurality of state parameters of the slope; a demodulator is connected to the optical fiber measuring units and configured to receive the acceleration time sequences of the slope; and further, the terminal device is connected to the demodulator and configured to perform multi-domain coupling analysis on the acceleration time sequences so as to generate a feature cloud map of the slope, perform sub-item detection on slope stability state based on the feature cloud map and preset multi-domain feature parameter indexes so as to obtain a sub-item detection result of the state of the slope, and generate a detection result of a dynamic feature and a deformation feature of the slope based on the sub-item detection result, such that a health state of the slope is determined comprehensively, accurately, and efficiently based on a multi-domain analysis result, improving reliability of slope stability health detection and diagnosis as well as accuracy and efficiency of distributed optical fiber measurement. Therefore, this application resolves the problem that the related art lacks efficient and precise scientific detection and analysis methods for targeted slope reinforcement treatment through time sharing and partitioning.

Some of additional aspects and advantages of this application will be provided in the following description, and some become evident in the following description or understood through the practice of this application.

BRIEF DESCRIPTION OF THE DRAWINGS

The foregoing and/or additional aspects and advantages of this application will become apparent and easily understandable from the following descriptions of the embodiments with reference to the accompanying drawings.

FIG. 6 is a flowchart of a slope detection method based on distributed optical fiber sensing according to an embodiment of this application.

FIG. 7 is a schematic structural diagram of an electronic device according to an embodiment of this application.

Figure 1:
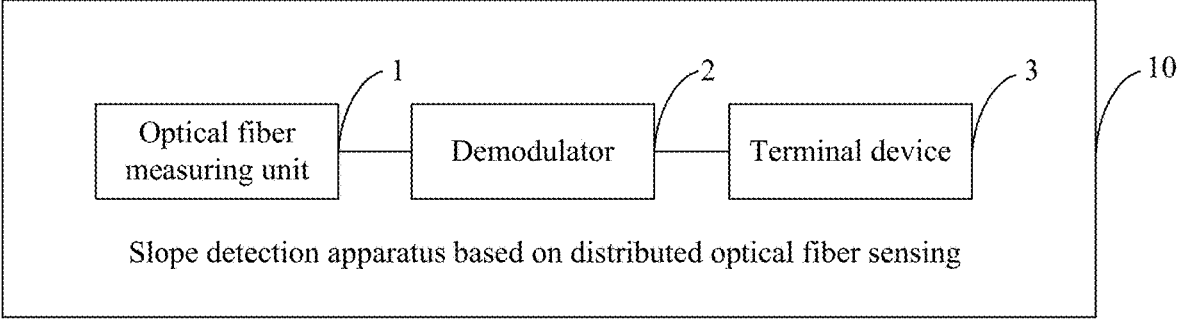
FIG. 1 is a sample diagram of a slope detection apparatus based on distributed optical fiber sensing according to an embodiment of this application.

Reference numerals: optical fiber measuring unit—1, demodulator—2, terminal device—3, slope—4, vertical drilling and layout in a slope body—5, metal pipe—6, optical fiber core—7, grating signal—8, cladding layer—9, memory—701, processor—702, and communication interface—703.

DETAILED DESCRIPTION OF THE EMBODIMENTS

The embodiments of this application are described below in detail, and are shown in the drawings. The same or similar numerals represent the same or similar elements or elements having the same or similar functions throughout the specification. The embodiments described below with reference to the accompanying drawings are exemplary, and are only used to explain this application but should not be construed as a limitation to this application.

A slope detection apparatus and method based on distributed optical fiber sensing in the embodiments of this application are described with reference to the accompanying drawings. To resolve the problem mentioned in the background, this application provides a slope detection apparatus based on distributed optical fiber sensing. In the embodiments of this application, optical fiber measuring units are arranged inside a slope and configured to measure acceleration time sequences of a plurality of state parameters of the slope; a demodulator is connected to the optical fiber measuring units and configured to receive the acceleration time sequences of the slope; and further, a terminal device is connected to the demodulator and configured to perform multi-domain coupling analysis on the acceleration time sequences so as to generate a feature cloud map of the slope, perform sub-item detection on slope stability state based on the feature cloud map and preset multi-domain feature parameter indexes so as to obtain a sub-item detection result of the state of the slope, and generate a detection result of a dynamic feature and a deformation feature of the slope based on the sub-item detection result, such that a health state of the slope is determined comprehensively, accurately, and efficiently based on a multi-domain analysis result, improving reliability of detection and diagnosis on the stability and health state of the slope as well as accuracy and efficiency of distributed optical fiber measurement. Therefore, this application resolves the problem that the related art lacks efficient and precise scientific detection and analysis methods for targeted slope reinforcement treatment through time sharing and partitioning.

Specifically, FIG. 1 is a schematic block diagram of a slope detection apparatus based on distributed optical fiber sensing according to an embodiment of this application.

As shown in FIG. 1, the slope detection apparatus 10 based on distributed optical fiber sensing includes optical fiber measuring units 1, a demodulator 2, and a terminal device 3.

The optical fiber measuring units 1 are arranged inside a slope and configured to measure acceleration time sequences of a plurality of state parameters of the slope; the demodulator 2 is connected to the optical fiber measuring units 1 and configured to receive the acceleration time sequences of the slope; and further, the terminal device 3 is connected to the demodulator 2 and configured to perform multi-domain coupling analysis on the acceleration time sequences so as to generate a feature cloud map of the slope, perform sub-item detection on slope stability state based on the feature cloud map and preset multi-domain feature parameter indexes so as to obtain a sub-item detection result of the state of the slope, and generate a detection result of a dynamic feature and a deformation feature of the slope based on the sub-item detection result.

It should be noted that in an embodiment of this application, the conventional optical fiber sensor used in the existing DAS technology is improved, the state parameters of the slope are integrated into a single system so as to form a three-component optical fiber sensor for three-component ground motion, which includes optical fiber measuring units.

Optionally, in an embodiment of this application, the state parameters of the slope include one or more of slope vibration, temperature, pressure, strain, or moisture content.

It can be understood that, in this embodiment of this application, the foregoing optical fiber sensor is used to measure the acceleration time sequences of a plurality of state parameters of the slope to obtain real-time data such as the vibration, temperature, pressure, strain, and moisture content, providing a real-time and reliable data source for the sub-item determining results of slope stability detection and accurate and efficient determining of slope health state.

Optionally, in an embodiment of this application, an arrangement manner of the optical fiber measuring units 1 includes: arranging the optical fiber measuring units in a surrounding manner in an S-shape at preset intervals along a surface of the slope, drilling bores at fixed points in the slope, and connecting the optical fiber measuring units 1 in series inside the bores.

Figure 2A:
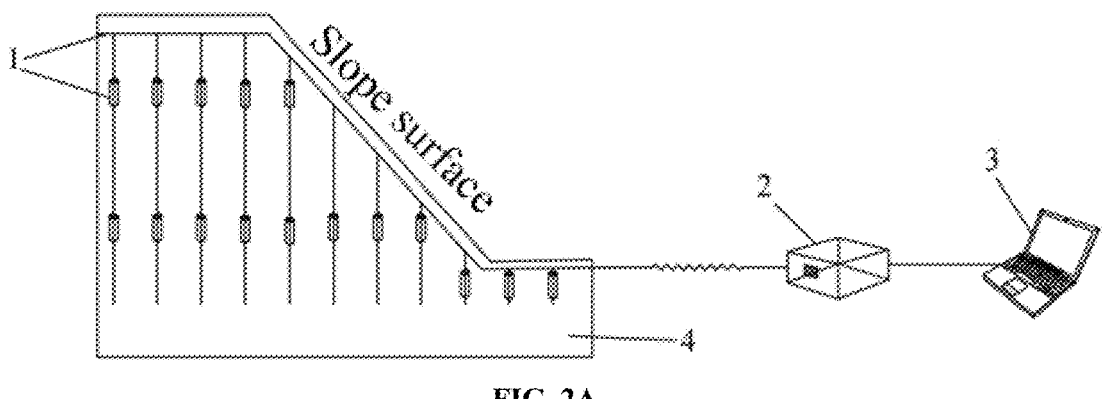
FIG. 2A-B show a cross section and a schematic diagram, viewed from top, of a slope based on distributed optical fiber sensing according to an embodiment of this application.
Figure 2B:
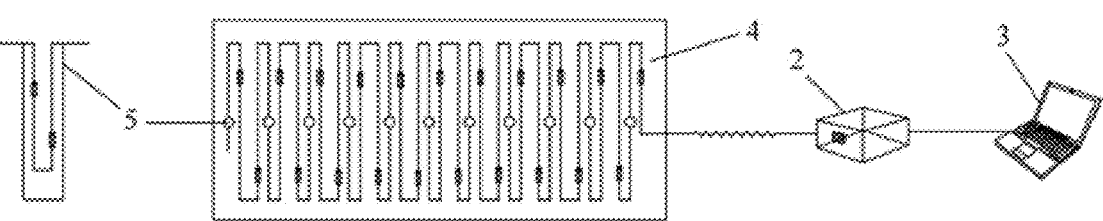
Figure 3:
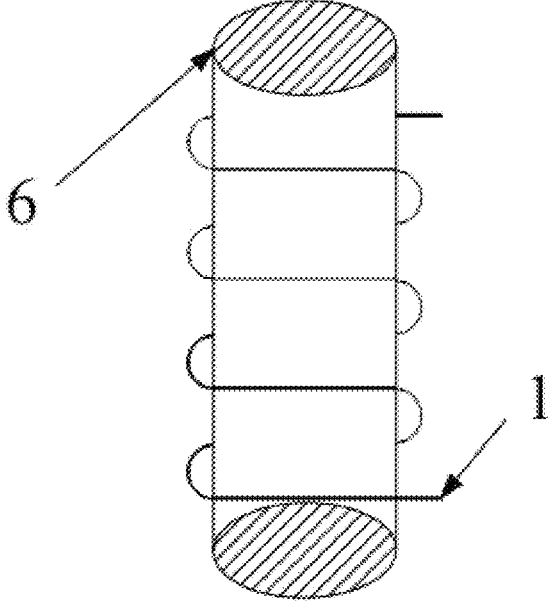
FIG. 3 is a schematic diagram of a three-component optical fiber sensor improved using an optical fiber winding method according to an embodiment of this application.

As shown in FIG. 2A-B, in this embodiment of this application, a distributed optical fiber sensor of a specific length is arranged on/inside the slope 4, and the optical fiber sensor is arranged in a surrounding manner along the surface of the slope in an S shape, wound around a pipe made of, for example, metal, where the optical fiber is wound at specific intervals in a helical shape to form an armored optical cable. In this way, as shown in FIG. 3, the optical fibers are distributed on the slope broader. In a manner 5 of drilling bores at fixed points in the slope, the optical fibers are connected in series inside the bores.

Figure 4A:
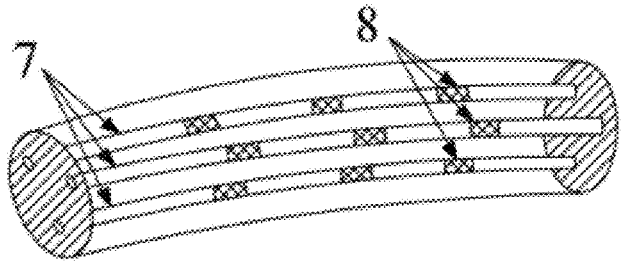
FIG. 4A-B are schematic diagrams of a three-component optical fiber sensor improved by adding an optical fiber core according to an embodiment of this application.
Figure 4B:
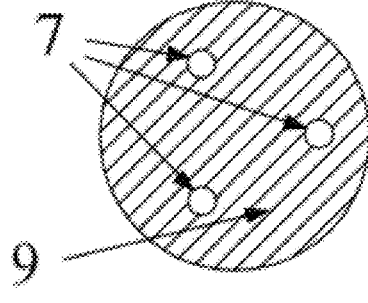

In addition, as shown in FIG. 4A-B, in an embodiment of this application, in addition to being wound around the pipe, the conventional optical fiber is improved by increasing the quantity of fiber cores in the optical fiber measuring unit 1. The quantity of fiber cores 7 in the original optical fiber is increased so as to obtain the required grating signals 8. The fiber core is built into the cladding layer 9 so as to obtain the three-component strain optical fiber sensor for three-component ground motion.

It should be noted that in this embodiment of this application, optical fibers can be laid by digging trenches and burying or bonding with quick-drying cement. Optical fibers are used to wind pipes made of, for example, metal, and they are then coupled using butyl superglue for optical cables and implanted into rock and soil. Subsequently, the trenches are backfilled with sand to strengthen the coupling. The optical fibers are arranged through drilling bores at fixed points in the longitudinal section of the slope, and therefore the optical fiber sensor is built inside the rock and soil to be coupled with the stratum.

Therefore, in this embodiment of this application parameters such as the temperature, strain, moisture content, and acceleration are integrated into a single system so as to obtain sub-item determining results of slope stability state monitoring. Therefore, the slope health state is determined comprehensively, accurately, and efficiently based on a multi-domain analysis result, thereby improving accuracy and efficiency of the existing distributed optical fiber measurement method.

Then, in this embodiment of this application, the demodulator 2 connected to the optical fiber measuring units 1 can receive the acceleration time sequence measured from the slope, and convert the above data sequence into corresponding waveform signals and digitize the signals.

Further, in the embodiment of this application, the terminal device 3 connected to the demodulator 2 can be used to perform multi-domain coupling analysis on the acceleration time sequences. The terminal device 3 may be a computer decision analysis terminal.

Specifically, in this embodiment of this application, the digitized signal of the ground demodulator 2 can be received and subject to data processing. Data processing includes automatic processing and manual processing. The automatic processing includes filtering, parameter selection, and the like, and the manual processing includes noise reduction, extracting precise parameters from the data interface, and showing vibration position, magnitude, and source parameters of the slope when the vibration, temperature, and pressure changes inside the slope. The computer decision analysis terminal is used to predict and analyze the internal damage state of the slope based on the data and images obtained after the above processing.

Optionally, in an embodiment of this application, the performing multi-domain coupling analysis on the acceleration time sequences so as to generate a feature cloud map includes: performing time domain transform analysis on the acceleration time sequences so as to obtain peak accelerations in different positions of the slope, and generating a first distribution cloud map of peak accelerations of different transverse and longitudinal sections of the slope based on the peak accelerations; performing frequency domain transform analysis on the acceleration time sequences, and generating a second distribution cloud map of spectral peaks of the different transverse and longitudinal sections of the slope by analyzing a spectrum and a peak change feature; performing time-frequency domain transform analysis on the acceleration time sequences, and generating a third distribution cloud map of energy spectrum peaks of the different transverse and longitudinal sections of the slope by analyzing an energy spectrum feature and a peak change; and generating the feature cloud map of the slope based on the first distribution cloud map, the second distribution cloud map, and the third distribution cloud map.

It should be noted that the computer decision analysis terminal adopts a multi-domain coupling analysis method in which the time domain, frequency domain, and time-frequency domain are comprehensively considered so as to obtain programs for processing the measured time domain, frequency domain, and frequency domain data, and to further generate the feature cloud map. The method specifically includes the following steps:

Step 1: The time domain data processing program in the computer decision analysis terminal 3 can obtain a peak of an acceleration time sequence, and draw a distribution cloud map of peak accelerations of different transverse and longitudinal sections of the slope by analyzing a peak change feature.

Step 2: The frequency domain data processing program in the computer decision analysis terminal 3 can perform frequency domain transform analysis on the acceleration time sequences, and draw a distribution cloud map of spectral peaks of the different transverse and longitudinal sections of the slope by analyzing a spectrum and a peak change feature thereof.

Step 3: The time-frequency domain data processing program in the computer decision analysis terminal 3 can perform time-frequency domain transform analysis on the measured acceleration time sequence, and draw a distribution cloud map of energy spectrum peaks of the different transverse and longitudinal sections of the slope by analyzing an energy spectrum feature and a peak change.

Further, in this embodiment of this application, the time domain, frequency domain, and time-frequency domain of the obtained acceleration signal in the slope are analyzed so as to obtain multi-domain waveform features of vibration signals. In addition, imagery processing is performed on distribution features of a plurality of parameters of multiple domains including the time domain, the frequency domain, and the time-frequency domain in and on the slope by using software such as Surfer, and the cloud map is then drawn through interpolation so as to obtain a multi-domain multi-parameter cloud map of the slope.

Therefore, in this embodiment of this application, the data of the time domain, frequency domain, and time-frequency domain is integrated into a system through the multi-domain coupling analysis, and the dynamic feature and the deformation feature of the slope are obtained according to multi-domain feature parameter indexes.

Optionally, in an embodiment of this application, the multi-domain feature parameter indexes include a time domain parameter index, a frequency domain parameter index, and a time-frequency domain parameter index, where the time domain parameter index includes one or more of peak acceleration, peak ground acceleration (PGA), amplification factor, peak displacement, residual displacement (RD), or plastic effect coefficient (PEC); the frequency domain parameter index includes one or more of natural frequency, relative displacement, or spectral peak; and the time-frequency domain parameter index includes one or more of arias intensity, seismic Hilbert energy spectrum peak, or marginal spectrum peak.

Specifically, in an embodiment of this application, the multi-domain and multi-parameter architecture of slope dynamic features includes main parameter indexes of the time domain, frequency domain, and frequency-time domain for analysis.

The time domain parameters mainly include PGA, peak ground velocity (PGV), peak ground displacement (PGD), RD, and PEC. The frequency domain parameters mainly include spectrum, frequency f and Fourier spectrum peak PFSA. The time-frequency domain parameters mainly include arias intensity (Ia), seismic Hilbert energy spectrum peak PHSA and marginal spectrum peak PMSA, which specifically represent the following:

In the time domain parameters, PGA represents the maximum inertial force borne by the slope under dynamic load; the amplification factor MPGA represents the ratio of the maximum inertial force borne by any part of the slope to the inertial force at the foot of the slope; PGD represents the maximum absolute value of the displacement of a point of the slope under dynamic load; and PEC represents the ratio of plastic deformation amount to peak displacement at any time, indicating the irreversible damage degree of the slope.

In the frequency domain parameters, the frequency f is determined by the inherent features of the slope such as hardness, quality, and external dimension; the relative displacement U is the relative deformation degree of a point compared with the slope toe under a natural frequency vibration; and PFSA represents the regions where energy is very concentrated in different natural frequency bands in the Fourier spectrum, and can reveal the relationship between different frequency components and slope deformation features.

In the time-frequency domain parameters, Ia reflects the energy released by the ground vibration at a point of the slope recorded by the instrument, and represents the degree of the total seismic energy absorbed by the ground, the damage degree, and the local intensity; PHSA represents the propagation feature of the total seismic energy of the original signal in the slope, and is used to analyze the global deformation response features of the slope; and PMSA reflects the energy propagation feature of an order of high-resolution sub-signal of the original signal, which is used to reflect the local deformation response feature of the slope.

It can be understood that in this embodiment of this application, the acceleration time sequences are used for the multi-domain coupling analysis so as to generate a feature cloud map, such that the stability and deformation trend of the slope can be predicted by analyzing the parameter distribution features in the time domain, frequency domain, and time-frequency domain, thereby comprehensively determining the stability and health state of the slope.

A slope detection apparatus based on distributed optical fiber sensing of this application is described in a specific embodiment.

Figure 5:
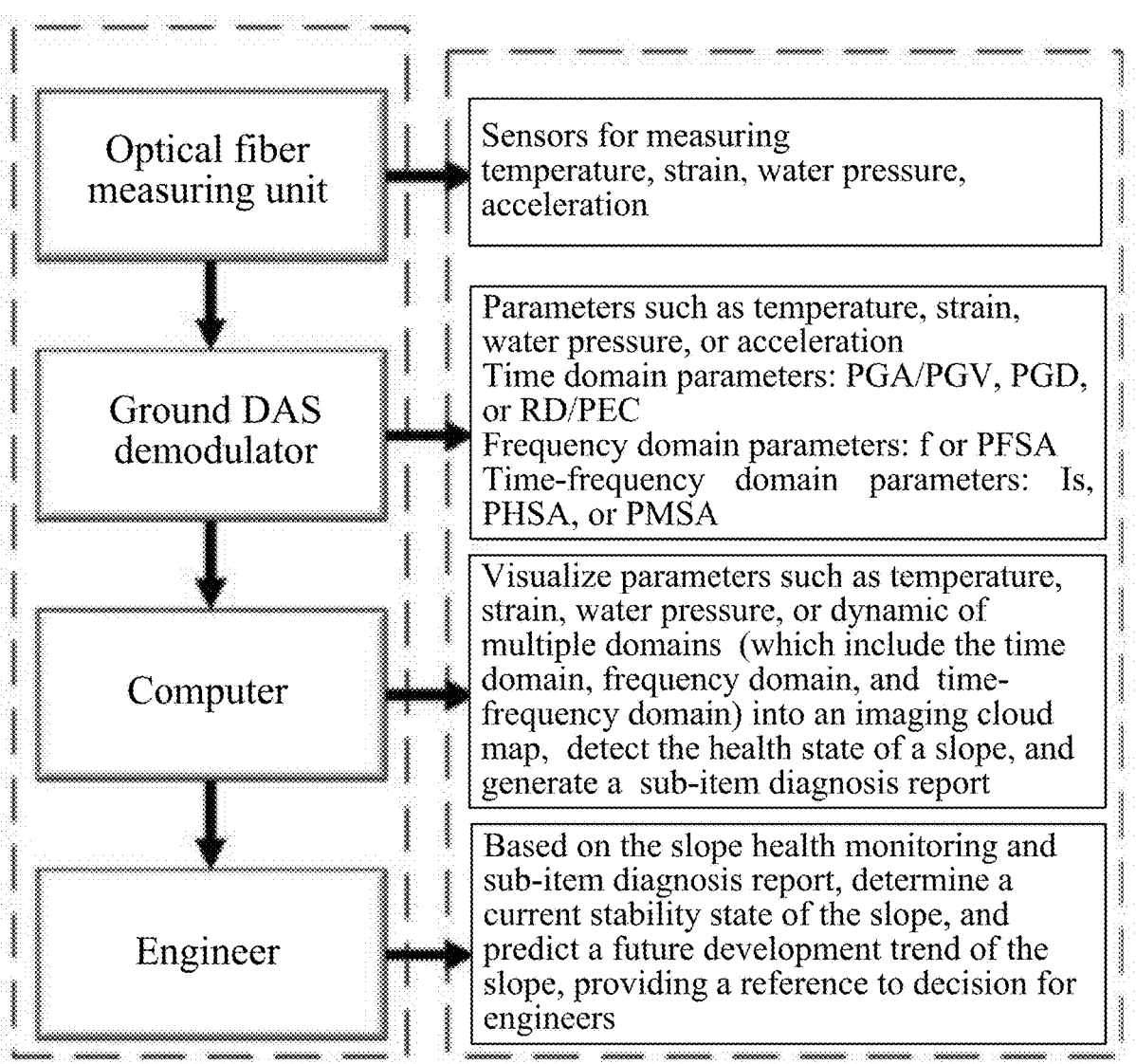
FIG. 5 is a schematic diagram of execution logic of a slope detection apparatus based on distributed optical fiber sensing according to an embodiment of this application.

FIG. 5 is a schematic diagram of execution logic of a slope detection process based on distributed optical fiber sensing. As shown in FIG. 5, the specific steps of the slope detection in this embodiment of this application are as follows:

Step 1: Based on an improved three-component DAS technology, an optical fiber layout plan is determined according to an actual situation on site, and optical fibers are laid densely in typical sections and regions of a slope. The optical fibers are implanted into the rock and soil body through drilling so as to obtain an imaging cloud map of multiple vertical and horizontal sections and regions of the slope. Data is acquired such as temperature, strain, moisture content and acceleration.

Step 2: A multi-domain and multi-parameter analysis framework system is established for slope dynamic features. Time domain parameters mainly include PGA, PGV, PGD, RD, and PEC; frequency domain parameters mainly include spectrum, f, and PFSA; and time-frequency domain parameters mainly include Ia, PHSA, and PMSA.

Step 3: In the ground demodulator or computer, signal processing and data imaging software is built in to visualize the multi-domain and multi-parameters in the computer. The features of different parameters in each domain are analyzed so as to visualize the distribution features of the cloud map and the physical meaning represented by the parameter, and the stable state of the slope is monitored and diagnosed by item so as to draw the conclusion of the item detection and diagnosis.

Step 4: Based on the multi-domain multi-parameter sub-item results of slope dynamic response, through detection and diagnosis, the current slope health state is determined efficiently and the future health state is predicted, and the determining result is outputted in the format of word/picture as a reference to the project decision on site for an engineer.

According to the slope detection apparatus based on distributed optical fiber sensing provided by this embodiment of this application. In this embodiment of this application, optical fiber measuring units are arranged inside a slope and configured to measure acceleration time sequences of a plurality of state parameters of the slope; a demodulator is connected to the optical fiber measuring units and configured to receive the acceleration time sequences of the slope; and further, the terminal device is connected to the demodulator and configured to perform multi-domain coupling analysis on the acceleration time sequences so as to generate a feature cloud map of the slope, perform sub-item detection on slope stability state based on the feature cloud map and preset multi-domain feature parameter indexes so as to obtain a sub-item detection result of the state of the slope, and generate a detection result of a dynamic feature and a deformation feature of the slope based on the sub-item detection result, such that a health state of the slope is determined comprehensively, accurately, and efficiently based on a multi-domain analysis result, improving reliability of detection and diagnosis on the stability and health state of the slope as well as accuracy and efficiency of distributed optical fiber measurement.

Next, a slope detection method based on distributed optical fiber sensing provided by an embodiment of this application is described with reference to the accompanying drawings.

FIG. 6 is a flowchart of a slope detection method based on distributed optical fiber sensing according to an embodiment of this application.

As shown in FIG. 6, the slope detection method based on distributed optical fiber sensing includes the following steps:

Step S601: Obtain acceleration time sequences of a plurality of state parameters of a slope.

Step S602: Perform multi-domain coupling analysis on the acceleration time sequences so as to generate a feature cloud map of the slope.

Optionally, in this embodiment of this application, the performing multi-domain coupling analysis on the acceleration time sequences so as to generate a feature cloud map includes: performing time domain transform analysis on the acceleration time sequences so as to obtain peak accelerations in different positions of the slope, and generating a first distribution cloud map of peak accelerations of different transverse and longitudinal sections of the slope based on the peak accelerations; performing frequency domain transform analysis on the acceleration time sequences, and generating a second distribution cloud map of spectral peaks of the different transverse and longitudinal sections of the slope by analyzing a spectrum and a peak change feature; performing time-frequency domain transform analysis on the acceleration time sequences, and generating a third distribution cloud map of energy spectrum peaks of the different transverse and longitudinal sections of the slope by analyzing an energy spectrum feature and a peak change; and generating the feature cloud map of the slope based on the first distribution cloud map, the second distribution cloud map, and the third distribution cloud map.

In step S603: Perform sub-item detection on slope stability state based on the feature cloud map and predetermined multi-domain feature parameter indexes so as to obtain a sub-item detection result of the state of the slope, and generate a detection result of a dynamic feature and a deformation feature of the slope based on the sub-item detection result.

Optionally, in this embodiment of this application, the multi-domain feature parameter indexes include a time domain parameter index, a frequency domain parameter index, and a time-frequency domain parameter index, where the time domain parameter index includes one or more of peak acceleration, PGA, amplification factor, peak displacement, RD, or PEC; the frequency domain parameter index includes one or more of natural frequency, relative displacement, or spectral peak; and the time-frequency domain parameter index includes one or more of arias intensity, seismic Hilbert energy spectrum peak, or marginal spectrum peak.

It should be noted that the foregoing explanations for the embodiments of the slope detection apparatus based on distributed optical fiber sensing are also applicable to the slope detection method based on distributed optical fiber sensing in this embodiment, and will not be repeated here.

According to the slope detection method based on distributed optical fiber sensing provided by this embodiment of this application, acceleration time sequences of a plurality of state parameters of the slope are obtained, and multi-domain coupling analysis is performed on the acceleration time sequences so as to generate a feature cloud map of the slope. Then, sub-item detection on slope stability state is performed based on the feature cloud map and preset multi-domain feature parameter indexes so as to obtain a sub-item detection result of the state of the slope. A detection result of a dynamic feature and a deformation feature of the slope is generated based on the sub-item detection result, such that stability and a health state in the slope are determined comprehensively, accurately, and efficiently based on a multi-domain analysis result, improving reliability of detection and diagnosis on the stability and health state of the slope. Further, parameters such as temperature, strain, moisture content, or acceleration are integrated in a single system, improving accuracy and efficiency of distributed optical fiber measurement method. In addition, image sub-items of a plurality of parameters of multiple domains including the time domain, frequency domain, and a time-frequency domain obtained using measured vibration signals can make the stability and the health state of the slope monitored and diagnosed more conveniently and intuitively, improving the ability to determine the local deformation of the slope.

FIG. 7 is a schematic structural diagram of an electronic device according to an embodiment of this application. The electronic device may include:

a memory 701, a processor 702, and a computer program stored on the memory 701 and capable of running on the processor 702.

When executing the program, the processor 702 implements the slope detection method based on distributed optical fiber sensing provided by the foregoing embodiment.

Further, the electronic device further includes:

a communication interface 703, which is configured for communication between the memory 701 and the processor 702.

The memory 701 is configured to store the computer program running on the processor 702.

The memory 701 may include a high-speed RAM memory, and may also include a non-volatile memory such as at least one disk memory.

If the memory 701, the processor 702, and the communication interface 703 are implemented independently, the communication interface 703, the memory 701, and the processor 702 may be connected to each other via a bus to complete mutual communication. The bus may be an industry standard architecture (ISA) bus, a peripheral component interconnect (PCI) bus, or an extended industry standard architecture (EISA) bus. The bus may be classified into an address bus, a data bus, a control bus, and the like. For ease of representation, only one thick line is used to represent the communication bus in FIG. 7, but this does not mean that there is only one bus or only one type of bus.

Optionally, in specific implementation, if the memory 701, processor 702, and communication interface 703 are integrated on one chip, the memory 701, processor 702, and communication interface 703 can communicate with each other through an internal interface.

The processor 702 may be a central processing unit (CPU) or an application specific integrated circuit (ASIC), or configured as one or more integrated circuit in the embodiments of this application.

This embodiment also provides a computer-readable storage medium, storing a computer program, where when the program is executed by a processor, the slope detection method based on distributed optical fiber sensing is implemented.

In the description of this specification, the description with reference to the terms such as "one embodiment", "some embodiments", "an example", "a specific example", or "some examples" means that the specific features, structures, materials, or characteristics described with reference to the embodiment or example are included in at least one embodiment or example of this application. In this specification, schematic representation of the above terms is not necessarily directed to the same embodiment or example. Moreover, the specific features, structures, materials, or characteristics described may be combined in a suitable manner in any one or more embodiments or examples. In addition, those skilled in the art may combine different embodiments or examples described in this specification and characteristics of the different embodiments or examples without mutual contradiction.

Moreover, the terms such as "first" and "second" are used only for the purpose of description and should not be construed as indicating or implying a relative importance, or implicitly indicating a quantity of indicated technical features. Thus, features limited by "first" and "second" may expressly or implicitly include at least one of that feature. In the description of this application, "N" means at least two, such as two or three, unless otherwise clearly and specifically limited.

Any process or method description in the flowchart or described in other manners herein can be understood as representing a module, segment, or part of code that includes one or N executable instructions for implementing steps of specific logical functions or steps of the process. In addition, the scope of the preferred implementations of this application includes additional implementations, which may not be in the order shown or discussed, including performing functions in a substantially simultaneous manner or in a reverse order according to the functions involved. This should be understood by persons skilled in the art to which the embodiments of this application belong.

It should be understood that each part of this application can be implemented by hardware, software, firmware, or a combination thereof. In the above implementations, N steps or methods may be implemented by using software or firmware that is stored in a memory and that is executed by a proper instruction execution system. For example, if implemented by using hardware, as in another embodiment, this implementation may be implemented by any one or a combination of the following technologies known in the art: a discrete logic circuit with a logic gate circuit for implementing a logic function on a data symbol, an application-specific integrated circuit with a suitable combinational logic gate circuit, a programmable gate array (PGA), a field programmable gate array (FPGA), and the like.

Persons of ordinary skill in the art can understand that all or some of the steps in the methods of the foregoing embodiments may be implemented by a program instructing relevant hardware. The program may be stored in a computer-readable storage medium. When executed, the program includes one of the steps of the method embodiment or a combination thereof

What is claimed is:

1. A slope detection apparatus based on distributed optical fiber sensing, comprising:

optical fiber measuring units arranged inside a slope and configured to measure acceleration time sequences of a plurality of state parameters of the slope;

a demodulator, wherein the demodulator is connected to the optical fiber measuring units and configured to receive the acceleration time sequences of the slope; and a terminal device, wherein the terminal device is connected to the demodulator and configured to perform multi-domain coupling analysis on the acceleration time sequences so as to generate a feature cloud map of the slope that comprises distribution features of time domain parameters, frequency domain parameters, and time-frequency domain parameters, comparing the distribution features of the time domain parameters, the frequency domain parameters, and the time-frequency domain parameters in the feature cloud map with predetermined multi-domain feature parameter indexes, and determine a stability and health state of the slope based on comparison results; wherein the predetermined multi-domain feature parameter indexes comprise predetermined time domain parameter indexes, predetermined frequency domain parameter indexes, and predetermined time-frequency domain parameter indexes;

wherein performing the multi-domain coupling analysis on the acceleration time sequences so as to generate the feature cloud map comprises:

performing time domain transform analysis on the acceleration time sequences so as to obtain peak accelerations in different positions of the slope, and generating a first distribution cloud map of peak accelerations of different transverse and longitudinal sections of the slope based on the peak accelerations;

performing frequency domain transform analysis on the acceleration time sequences, and generating a second distribution cloud map of spectral peaks of the different transverse and longitudinal sections of the slope by analyzing a spectrum and a peak change feature;

performing time-frequency domain transform analysis on the acceleration time sequences, and generating a third distribution cloud map of energy spectrum peaks of the different transverse and longitudinal sections of the slope by analyzing an energy spectrum feature and a peak change; and generating the feature cloud map of the slope based on the first distribution cloud map, the second distribution cloud map, and the third distribution cloud map.

2. The apparatus according to claim 1, wherein the state parameters of the slope comprise one or more of slope vibration, temperature, pressure, strain, or moisture content.

3. The apparatus according to claim 1, wherein an arrangement manner of the optical fiber measuring units comprises: arranging the optical fiber measuring units in a surrounding manner in an S-shape at predetermined intervals along a surface of the slope, and connecting the optical fiber measuring units in series inside bores drilled at fixed points in the slope.

4. The apparatus according to claim 1, wherein the multi-domain feature parameter indexes comprise a time domain parameter index, a frequency domain parameter index, and a time-frequency domain parameter index, wherein the time domain parameter index comprises one or more of peak acceleration, Peak Ground Acceleration (PGA), amplification factor, peak displacement, Residual Displacement (RD), or Plastic Effect Coefficient (PEC); the frequency domain parameter index comprises one or more of natural frequency, relative displacement, or spectral peak; and the time-frequency domain parameter index comprises one or more of arias intensity, seismic Hilbert energy spectrum peak, or marginal spectrum peak.

5. A slope detection method based on distributed optical fiber sensing, wherein the method comprises the following steps:

measuring, by optical fiber measuring units arranged inside a slope, acceleration time sequences of a plurality of state parameters of the slope;

receiving, by a demodulator connected to the optical fiber measuring units, the acceleration time sequences of the slope; and performing, by a terminal device connected to the demodulator, multi-domain coupling analysis on the acceleration time sequences so as to generate a feature cloud map of the slope that comprises distribution features of time domain parameters, frequency domain parameters, and time-frequency domain parameters; and comparing the distribution features of the time domain parameters, the frequency domain parameters, and the time-frequency domain parameters in the feature cloud map with predetermined multi-domain feature parameter indexes, and determining a stability and health state of the slope based on comparison results; wherein the predetermined multi-domain feature parameter indexes comprise predetermined time domain parameter indexes, predetermined frequency domain parameter indexes, and predetermined time-frequency domain parameter indexes;

wherein step of performing the multi-domain coupling analysis on the acceleration time sequences so as to generate the feature cloud map comprises:

performing time domain transform analysis on the acceleration time sequences so as to obtain peak accelerations in different positions of the slope, and generating a first distribution cloud map of peak accelerations of different transverse and longitudinal sections of the slope based on the peak accelerations;

performing frequency domain transform analysis on the acceleration time sequences, and generating a second distribution cloud map of spectral peaks of the different transverse and longitudinal sections of the slope by analyzing a spectrum and a peak change feature;

performing time-frequency domain transform analysis on the acceleration time sequences, and generating a third distribution cloud map of energy spectrum peaks of the different transverse and longitudinal sections of the slope by analyzing an energy spectrum feature and a peak change; and generating the feature cloud map of the slope based on the first distribution cloud map, the second distribution cloud map, and the third distribution cloud map.

6. The method according to claim 5, wherein the state parameters of the slope comprise one or more of slope vibration, temperature, pressure, strain, or moisture content.

7. The method according to claim 5, wherein an arrangement manner of the optical fiber measuring units comprises: arranging the optical fiber measuring units in a surrounding manner in an S-shape at predetermined intervals along a surface of the slope, and connecting the optical fiber measuring units in series inside bores drilled at fixed points in the slope.

8. The method according to claim 5, wherein the multi-domain feature parameter indexes comprise a time domain parameter index, a frequency domain parameter index, and a time-frequency domain parameter index, wherein the time domain parameter index comprises one or more of peak acceleration, Peak Ground Acceleration (PGA), amplification factor, peak displacement, Residual Displacement (RD), or Plastic Effect Coefficient (PEC); the frequency domain parameter index comprises one or more of natural frequency, relative displacement, or spectral peak; and the time-frequency domain parameter index comprises one or more of arias intensity, seismic Hilbert energy spectrum peak, or marginal spectrum peak.

* * * * *